US008638726B2

(12) United States Patent
Kitchin et al.

(10) Patent No.: US 8,638,726 B2
(45) Date of Patent: Jan. 28, 2014

(54) DEVICE, SYSTEM, AND METHOD FOR BROADCASTING PREDEFINED REFERENCE MAPS FOR WIRELESS COMMUNICATION

(75) Inventors: Duncan M. Kitchin, Beaverton, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1361 days.

(21) Appl. No.: 11/979,840

(22) Filed: Nov. 8, 2007

(65) Prior Publication Data

US 2008/0159220 A1 Jul. 3, 2008

Related U.S. Application Data

(60) Provisional application No. 60/858,193, filed on Nov. 8, 2006.

(51) Int. Cl.
*H04W 4/00* (2009.01)
(52) U.S. Cl.
USPC ............ 370/329; 370/328; 370/331; 370/338
(58) Field of Classification Search
USPC ......... 370/313, 328–330, 335, 336, 349, 473, 370/474
See application file for complete search history.

(56) References Cited

U.S. PATENT DOCUMENTS

| 6,804,215 | B1* | 10/2004 | Tanoue | 370/335 |
|---|---|---|---|---|
| 7,751,364 | B2* | 7/2010 | Won et al. | 370/329 |
| 2002/0051424 | A1* | 5/2002 | Krishnamoorthy et al. | 370/329 |
| 2002/0136168 | A1* | 9/2002 | Struhsaker et al. | 370/277 |
| 2002/0141355 | A1* | 10/2002 | Struhsaker et al. | 370/328 |
| 2003/0031149 | A1* | 2/2003 | Odenwalder et al. | 370/335 |
| 2005/0107036 | A1* | 5/2005 | Song et al. | 455/23 |
| 2005/0201325 | A1* | 9/2005 | Kang et al. | 370/328 |
| 2006/0126553 | A1* | 6/2006 | Lim et al. | 370/321 |
| 2006/0153112 | A1* | 7/2006 | Lim et al. | 370/310 |
| 2006/0153227 | A1* | 7/2006 | Hwang et al. | 370/328 |
| 2007/0060146 | A1* | 3/2007 | Won et al. | 455/445 |
| 2007/0064720 | A1* | 3/2007 | Sterenson et al. | 370/445 |
| 2007/0086474 | A1* | 4/2007 | Lee et al. | 370/447 |

* cited by examiner

*Primary Examiner* — Ian N Moore
*Assistant Examiner* — Jenee Alexander
(74) *Attorney, Agent, or Firm* — Cool Patent, P.C.; Joseph P. Curtin (57) ABSTRACT

A method, apparatus and system for transmitting a data link descriptor or MAP signal describing sub-burst transmissions having a common number of resource units allocated thereto. The MAP signal may include the length of the common number of resource units allocated thereto and the modulation and coding schemes to be used thereby. A method, apparatus and system for transmitting an ordered MAP signal sequence describing a series of transmissions each having a number of resource units allocated thereto. A first plurality of locations in the ordered sequence may describe lengths of resource units. A second plurality of locations in the ordered sequence may describe numbers of transmissions having the lengths described in one of the first plurality of locations. A third plurality of locations in the ordered sequence may describe a number of transmissions using one of a plurality of modulation and coding schemes. Other embodiments are described and claimed.

13 Claims, 5 Drawing Sheets

DEVICE, SYSTEM, AND METHOD FOR BROADCASTING PREDEFINED REFERENCE MAPS FOR WIRELESS COMMUNICATION

PRIOR APPLICATION DATA

The present application claims priority from U.S. provisional application No. 60/858,193, filed on Nov. 8, 2006, which is incorporated by reference in its entirety.

BACKGROUND OF THE INVENTION

Due to increasing demand for broadband communications, high-speed telecommunication services, such as wireless mediums, which may be relatively inexpensive as compared to existing cable and landline technologies, may be provided to subscribers. Accordingly, it may be desirable to improve efficiency and/or capacity of broadband wireless communication systems.

A data link or medium access protocol (MAP) descriptor of a station, or another descriptor, may be transmitted to other stations to describe a data link layer or medium access control (MAC) layer of the station to the other stations for establishing wireless communication therebetween. There is typically a one-to-one correspondence between each transmission and data link or MAP descriptor in which the transmission is described. Transmitting data link or MAP descriptors with a high rate (e.g., once every transmission and/or frame) may result in excessive network overhead. For example, for voice-connection networks, relatively short packets (e.g., a few tens of bytes), which may be referred to as sub-burst transmissions, may be simultaneously transmitted over, for example, several hundred active connections, at intervals of approximately 20 ms, or four frames. In such embodiments, the resources consumed by the transmission of the broadcast data link or MAP descriptors may be significant as compared to the resources consumed by the voice' transmissions themselves.

A need exists for a more efficient way of transmitting MAP signal or data link descriptor data in the data link layer for reducing the overhead of the layer.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. It will, however, be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the present invention in relation to wireless networks utilizing orthogonal frequency division multiplexing (OFDM) modulation or Orthogonal Frequency Division Multiple Access (OFDMA) modulation, the embodiments of present invention are not limited thereto and, for example, could be implemented using other multi-carrier or single carrier spread spectrum techniques such as direct sequence spread spectrum (DSSS), frequency hopping spread spectrum (FHSS), code division multiple access (CDMA) and others. Although some embodiments of the invention may be described in reference to mobile networks and/or broadband wireless access (BWA) networks, embodiments discussed herein are not necessarily so limited. For example, embodiments of the invention are not limited to BWA networks and can be applied to other types of wireless networks where similar advantages may be obtained. Such networks specifically include, but are not limited to, wireless local area networks (WLANs), wireless personal area networks (WPANs), wireless metropolitan area networks (WMANs), and/or wireless wide area networks (WWANs).

Networks described herein (e.g., such as BWA networks) may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Cor1-2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), IEEE 802.16-2004/Cor1-2005 or IEEE 802.16e-2005, which may herein be referred to as the "IEEE 802.16e-

2005" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or the functionality of wireless network 100 and components thereof may be defined according to, for example, the IEEE 802.16 standards (e.g., which may be referred to as a worldwide interoperability for microwave access (WiMAX)). Other standards may be used with embodiments of the invention.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCs), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Figure 1:
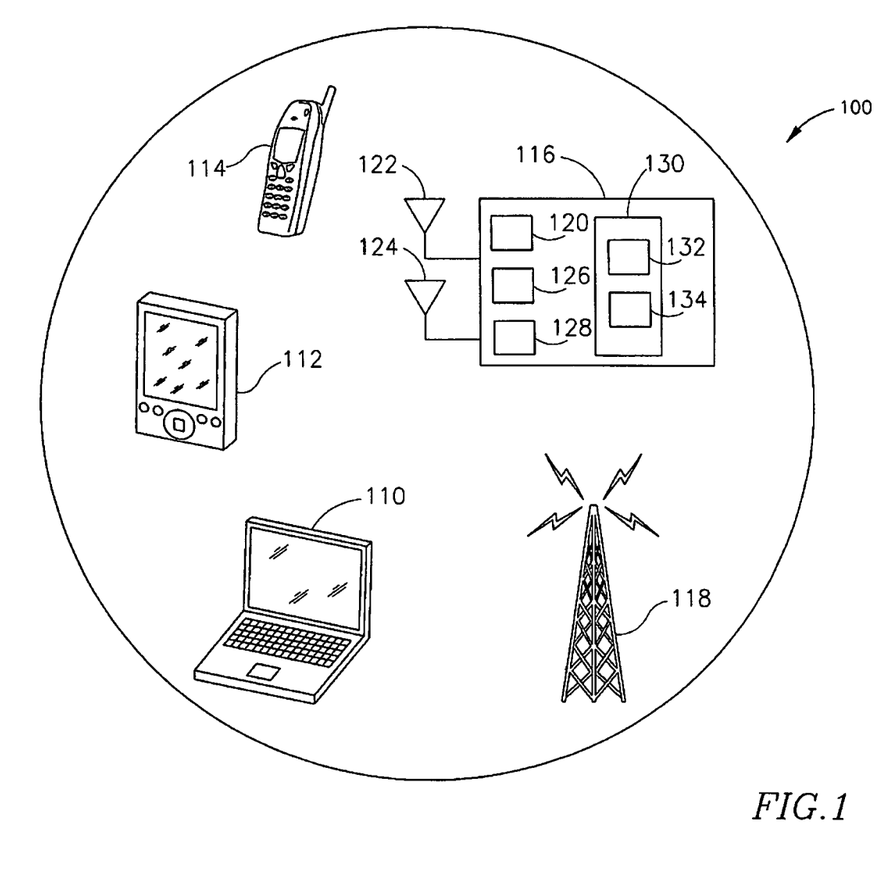
FIG. 1 is a schematic illustration of a wireless network according to an embodiment of the present invention.

Reference is made to FIG. 1, which schematically illustrates a wireless network 100 according to an embodiment of the present invention. Wireless network 100 may include a provider network (PN) and/or a base station (BS) 118, and one or more mobile stations (MSs) 110, 112, 114, and/or 116. It may be appreciated that although the term "mobile station" is used herein, mobile stations 110, 112, 114, and/or 116 need not be mobile and may be for example, non-mobile or fixed. In some embodiments, base station 118, for example, in WLANs, may be referred to as an access point (AP), terminal, devices, apparatuses, and/or node, and mobile stations 110, 112, 114, and/or 116 may be referred to as a stations (STAs), terminals, devices, apparatuses, and/or nodes. The terms base station and mobile station are, however, used merely as an example throughout this specification and their denotation in this respect is in no way intended to limit the inventive embodiments to any particular type of network or protocols. Mobile station 116 may include, for example, a processor 120, a transmitter 122, a receiver 124, a memory 126, and a long-term storage device 128 (e.g., a hard disk and/or computer-readable storage medium). Mobile station 116 may include, for example, a station management component 130, which may, for example, include a physical (PHY) layer management component 132 for managing PHY layer components, such as processor 120, and a medium access control (MAC) or data link layer management component 134 for transmitting MAP or data link descriptor signals and managing communication with other devices, such as, mobile stations 110, 112, and/or 114. In some embodiments, other mobile stations 110, 112, and/or 114 and BS 118 may have similar components.

Wireless network 100 may facilitate wireless access and communication between each of mobile stations 110, 112, 114, and/or 116, and BS 118, using a PN (e.g., via radio frequency (RF) channels). For example, for mobile Internet access, data may be transmitted over a radio channel between BS 118 and one or more mobile stations 110, 112, 114, and/or 116. In some embodiments, the data may include downlink transmissions from BS 118 to mobile stations 110, 112, 114, and/or 116 and uplink transmissions from mobile stations 110, 112, 114, and/or 116 to BS 118, and transmissions to and from different mobile stations 110, 112, 114, and/or 116, which may for example be multiplexed in time and frequency using OFDM and/or OFDMA modulation protocols. In one embodiment, wireless network 100 and components thereof may be configured to use one or more protocols compatible with the IEEE 802.16 (e.g., IEEE 802.16-2005 Amendment) protocol and/or the WiMAX protocol. Other protocols may be used.

Each of mobile stations 110, 112, 114, and/or 116, and BS 118, may include a processor (e.g., processor 120) including logic (e.g., including hard circuitry, processor and software, or a combination thereof) to allocate lengths of resource units in a transmission frame to each of multiple sub-burst transmissions, frames, signals, sub-burst, frame divisions, portions, or subsection, sub-frames, resource units, or other transmissions transmitted by the mobile station as described in one or more embodiments of the invention. A resource unit may be, for example, a (e.g., minimum) unit or measure of time and/or frequency in which data may be transmitted, for example, wirelessly. A resource unit may be a position in which data may potentially be exchanged, for example, in wireless communication transmission signals. A resource unit may have a time length corresponding to the duration of time used to transmit a plurality of multiplexing symbols and/or a frequency length corresponding to the frequencies used for transmitting a plurality of frequency subcarriers. In another example, a resource unit may be a partition of a larger time and/or frequency structure, such as, for example, a frame, a HARQ region, a sub-burst, and/or a transmission.

In some embodiments, each of mobile stations 110, 112, 114, and/or 116, and BS 118, may include a transmitter, receiver, transceiver, one or more antennas, radio frequency (RF) or other interface, and/or components adapted for transmitting and/or receiving signals, such as, sub-burst transmission, for example, using, HARQ signals. Other signals or devices may be used for allocating lengths of resource units, transmitting, and/or receiving according to embodiments described herein. A controller or processor (e.g., processor 120) may be integrated with or control the operation of components such as a transmitter (e.g., transmitter 122) or receiver (e.g., receiver 124).

In some embodiments, a frame (e.g., a radio frame) may be a portion of a transmitted and/or received communication in, for example, wireless network 100. In some embodiments, a frame may describe or define a periodically repeating segment structure of a larger communication signal or stream. In some embodiments, each repeating frame may include substantially different information, for example, which may be transmitted during separate transmission periods. For example, frames may be defined and may include BWA technology according to, for example, the IEEE 802.16e-2005 standard or mobile WiMAX profiles. According to the mobile WiMAX profiles, the duration of frames or transmission time interval (TTI) may be, for example, approximately 5 ms. Other frame or radio frame sizes such as for example, 2, 2.5, 4, 8, 10, 12, and 20 ms may be used as, for example, specified in the IEEE 802.16e-2005 standard specification. In some embodiments, a frame may include, for example, a primary synchronization channel (PSCH), broadcast channel (BCH), medium access protocol (MAPS), and/or common control channel (CCCH).

In one embodiment, (e.g., according to a mobile WiMAX configuration) a single frame (e.g., typically having a transmission duration of approximately 5 ms, but other durations may be used) may include, for example: (i) a downlink transmission from BS 118 to one of mobile stations 110, 112, 114, and 116, bounded in time and frequency; (ii) an uplink transmission from one of mobile stations 110, 112, 114, and 116 to BS 118 bounded in time and frequency; and (iii) a data link or MAP descriptor, which may indicate the locations of downlink and uplink transmissions in time and frequency, and the destinations or sources of the respective transmissions. In one embodiment, the MAP broadcast of a current frame may provide information for transmissions in current, subsequent, and/or preceding frames. For example, in the mobile WiMAX, IEEE 802.16-2005 Amendment protocol, a MAP broadcast may describe downlink transmissions in the current frame, and uplink transmissions in the following frame. A frame may include a portion of a broadcast or transmission. The MAP broadcast may include other or alternative information.

In conventional transmissions, a data link or MAP descriptor may be transmitted for and describe each sub-burst, transmission, and/or frame. Such descriptor broadcast schemes may transmit information with enough specificity for each sub-burst transmission to change characteristics thereof (e.g., regions in time and frequency allocated thereto for particular mobile stations 110, 112, 114, and 116 and/or connections) in substantially every frame for highly flexibility resource assignment that may support rapidly changing systems or networks (e.g., such as the mobile Internet).

However, transmitting such a high rate of data link or MAP descriptor broadcast signals with such a high rate may result in significant network overhead. For example, for voice-connection networks, relatively short packets (e.g., a few tens of bytes), which may be referred to as sub-burst transmissions), may be simultaneously transmitted to and from mobile stations 110, 112, 114, and/or 116, using, for example, several hundred active connections, at intervals of approximately 20 ms, or four frames. In such embodiments, the resources consumed by the transmission of the data link or MAP descriptor may be significant as compared to the resources consumed by the voice transmissions themselves. Accordingly, there may be a tradeoff between flexible resource assignment and overhead, which may, for example, be optimally balanced depending on the type of system traffic.

Embodiments of the present invention may provide a signal scheme for a MAP or other data link descriptor for permitting an optimized tradeoff point for balancing flexible resource assignment and overhead.

In one embodiment, (e.g., when large numbers of voice connections are used) mobile stations 110, 112, 114, and/or 116 may transmit data link or MAP descriptors for collectively describing (e.g., substantially simultaneously) each of two or more transmissions (e.g., sub-burst transmissions) with individual specificity. As compared with conventional systems, such embodiments may reduce network overhead, while preserving the specificity of information transmitted for each sub-burst transmission. For example, the optimized MAP signal or other data link descriptor may concurrently describe characteristics or parameters common to two or more sub-burst transmissions or other sub-transmissions, such as, for example, a length of resource units allocated thereto and a modulation and coding scheme used for the sub-burst transmissions. Such embodiments may use less transmission time and/or resources than individually describing the characteristics for each sub-burst transmission in a separate data link or MAP descriptor signal.

It may be appreciated that conventional data link descriptor signals and/or structures may be used with or be incorporated into data link descriptor signals structures described according to embodiments of the invention. Thus, embodiments described herein may be backwards compatible with and/or may use and benefit of other data link descriptor signal schemes (e.g., MAP signals optimized for mobile WiMAX protocols).

Figure 2:
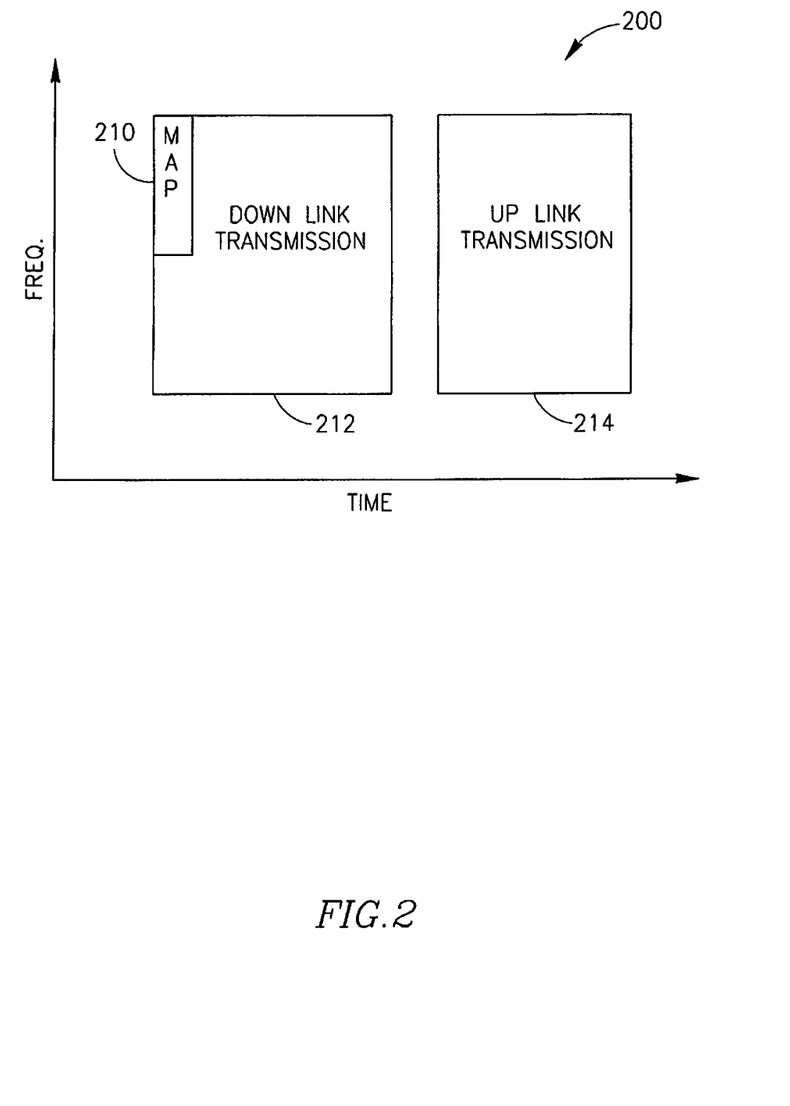
FIG. 2 is a schematic illustration of a transmission frame including a data link descriptor according to an embodiment of the present invention.

Reference is made to FIG. 2, which schematically illustrates a transmission frame 200 including data link descriptor 210 according to an embodiment of the invention. For example, in the mobile WiMAX protocol, data may be transmitted using, for example, hybrid automatic repeat request (HARQ) signals. For example, a downlink transmission 212 (e.g., or an uplink transmission 214) may include a 1-dimensional HARQ region described by a single data link descriptor (e.g., a MAP signal) of data link descriptor 210. Data link descriptors other than MAPs may be used.

Figure 3:
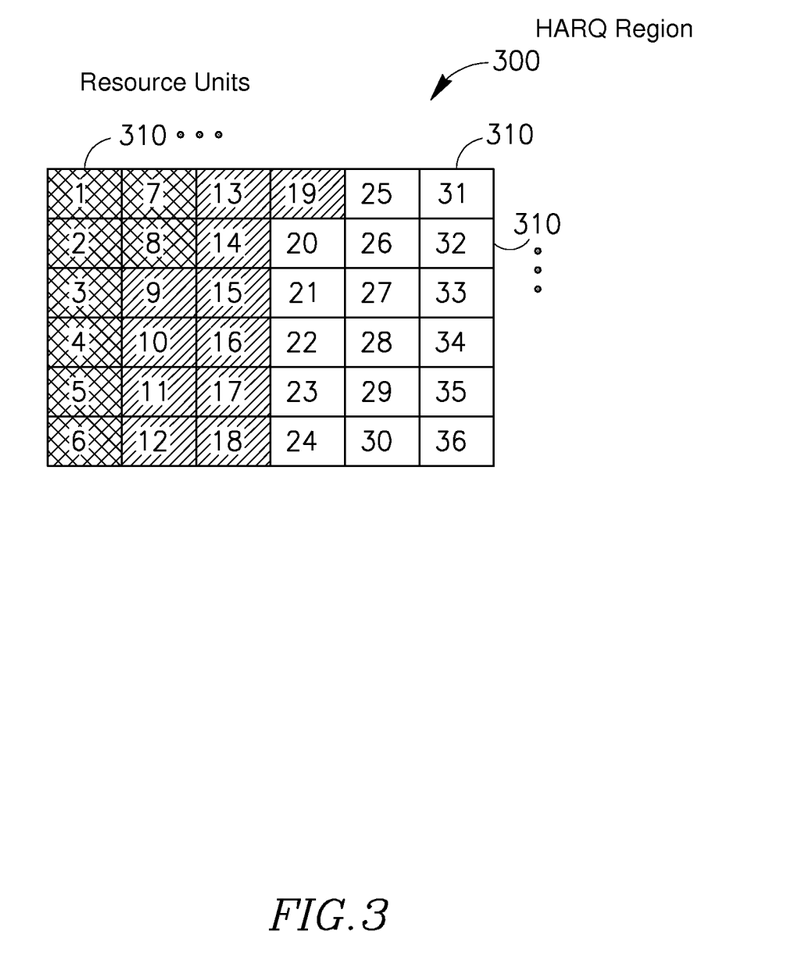
FIG. 3 is a schematic illustration of an allocation of resources in a hybrid automatic repeat request (HARQ) region of a transmission according to an embodiment of the present invention.

Reference is made to FIG. 3, which schematically illustrates an allocation of resources in a HARQ region 300 of a transmission according to an embodiment of the invention. HARQ region 300 may include or be partitioned into multiple resource units 310, each of which may be allocated to portions of a transmission frame or sub-burst transmissions, each of which may be transmitted to a mobile station (e.g., one of mobile stations 110, 112, 114, and/or 116). For example, HARQ region 300 may be partitioned in time and frequency into (e.g., minimum) frequency-time resource units 310. In one embodiment, transmissions consisting of (e.g., OFDMA) symbols may be transmitted over a period of time (e.g., on the order of microseconds to hundreds of microseconds), and each (e.g., OFDMA) symbol may include a plurality of (e.g., on the order of tens to thousands) simultaneously transmitted frequency subcarriers. A frequency-time resource unit 310 may have a time length corresponding to the duration of time used to transmit a plurality of (e.g., three) symbol (e.g., OFDMA symbols) and a frequency length corresponding to the frequencies used for transmitting a plurality of (e.g., four) subcarriers.

The HARQ region may be linearized, for example, by numbering or ordering the resource units 310 (e.g., resource units numbered 1-36) in HARQ region 300. In one embodiment, minimum frequency-time resource units 310 may be linearized, for example, in a frequency-first order. For example, for a two dimensional HARQ region 300 (e.g., spanning multiple sub-carrier blocks and/or multiple symbol blocks), an ordering may determine the allocation of the resource units 310 in a one dimensional sequence of transmitted data. In the frequency-first order, all of the (e.g., integer, N) resource units 310 allocated during the first allocated symbol block may be allocated to the first (e-g., integer, N) data blocks, followed by the next (e.g., integer, N) resource units allocated during the second symbol block may be allocated to the next N data blocks. For example, each portion of a transmission frame may be assigned a number or order corresponding to the number or order of resource units 310 allocated to the transmission. For example, according to the demonstrative embodiment depicted in FIG. 3, (e.g., eight (8)) resource units 310 numbered 1-8 may be allocated to a first sub-burst transmission, (e.g., 11) resource units 310 numbered 9-19 may be allocated to a second sub-burst transmission, and so on. Resource units 310 allocated for each sub-burst transmission may be indicated by a first, second, and third pattern, respectively, in FIG. 3.

In some embodiments, (e.g., in voice-connection networks) all or a large number of sub-burst or voice-packet transmissions may have common characteristics, such as, for example, approximately equal transmission lengths (e.g., or may be allocated an approximately equal number of resource units 310 or bytes). In another embodiment, (e.g., when using a variable-rate voice codec) each of the sub-burst transmissions may have one of a relatively few distinct lengths. According to embodiments of the invention, when multiple (e.g., all or a large number of) sub-burst transmissions have approximately equal transmission lengths, a MAP signal or other data link descriptor may include data corresponding to each of the multiple sub-bursts. Transmitting one data link descriptor corresponding to multiple sub-bursts may reduce the number of data link descriptors transmitted in network 100. In some embodiments of the invention, at some times, one data link descriptors (e.g., MAP signal) may be transmitted for each sub-burst transmission.

In one embodiment, an optimized data link descriptor or MAP signal may describe two or more sub-burst transmissions having a common number of resource units 310 allocated thereto. For example, the MAP signal may include at least the common number of resource units 310 allocated to each of the two or more sub-burst transmissions and the modulation and coding schemes to be used by each of the two or more sub-burst transmissions. For example, a second MAP signal may be transmitted that may, for example, describe a second two or more sub-burst transmissions having a second common number of resource units allocated thereto. The MAP signal may include the second common number of resource units allocated to each of the second two or more sub-burst transmissions and the modulation and coding schemes to be used by each of the two or more sub-burst transmissions. For example, at least two of the sub-burst transmissions may use different modulation and coding schemes.

For example, a MAP signal may include a numerical code that indicates the modulation and coding schemes to be used by each of two or more sub-burst transmissions. In some embodiments, at least two of the sub-burst transmissions may use different modulation and coding schemes. The MAP signal may include a different numerical code that may be used for each of the at least two of the sub-burst transmissions to indicate the different modulation and coding schemes used thereby.

In one embodiment, an optimized data link descriptor or MAP descriptor may be used for describing characteristics common to two or more sub-burst transmissions. The characteristics common to the two or more sub-burst transmissions may include, for example, a length of resource units allocated thereto, a list of a fixed length of connections, a modulation and coding scheme to be used for the sub-burst transmissions, protocol control information (PCI) descriptor, a preamble or preamble sequence, a header, a single recipient node (e.g., a unicast mode), a group of recipient nodes (e.g., a multicast mode), or the set of all recipient nodes (e.g., a broadcast mode), a source address, a service access point (SAP) to identify the type of protocol being carried or other values to indicate other network layer protocols, a cyclic redundancy check (CRC) or other error detection sequences to protect a transmission from corruption while being transmitted over a physical medium, an inter frame gap signal, a byte order signal, a carrier sense multiple access (CSMA) protocol descriptor and/or collision detection (CD) protocol descriptor to control access to the shared Ethernet medium, and/or other shared or common qualities, parameters or characteristics of multiple sub-burst or sub-frame transmissions.

In one embodiment, when substantially all of a multiple sub-bursts have approximately equal transmission lengths, a single data link or MAP descriptor may replace multiple conventional data link or MAP descriptors, for example, as many as the number of the multiple sub-bursts. For example, an optimized data link or MAP descriptor signal, rather than describing independently the size of each of a large number of sub-bursts, (e.g., and a modulation and coding scheme for each of the sub-bursts), may describe, for example:

(i) a length in number of resource units common to multiple sub-bursts;

(ii) the modulation and coding scheme used for the multiple sub-bursts; and/or (iii) a list of connections for stations transmitting the multiple sub-bursts.

Other qualities, parameters or characteristics or different combinations of characteristics of sub-bursts may be described.

In some embodiments, connections (e.g., voice connections) in network 100 may be subject to link adaptation, in which modulation and coding schemes (MCSs) may vary, for example, for each connection and/or frame, to account for varying channel conditions between each mobile stations 110, 112, 114, and/or 116 and BS 118. According to such embodiments, a second optimization may be used, in which a data link or MAP descriptor for a single (e.g., downlink) HARQ region may specify, for example:

(i) a first length in resource units;

(ii) a first modulation and coding scheme;

(iii) a first number $X_1$ (iv) a list of length $X_1$ of connections over which sub-bursts may be transmitted using the first modulation and coding scheme;

(v) a second length in resource units;

(vi) a second modulation and coding scheme;

(vii) a second number $X_2$;

(viii) a list of length $X_2$ of connections over which sub-bursts may be transmitted using the second modulation and coding scheme;

(ix) an nth length in resource units;

(x) an nth modulation and coding scheme;

(xi) an nth number $X_n$; and/or (xii) a list of length $X_n$ of connections over which sub-bursts may be transmitted using the nth modulation and coding scheme.

In one embodiment, when using multiple sub-bursts having the same transmission length and modulation and coding scheme, a single optimized data link or MAP descriptor may replace a number of conventional data link or MAP descriptors, for example, as many as or equal to the number of the multiple sub-bursts. Such optimizations may greatly reduce network 100 overhead associated with conventional data link or MAP transmissions, while maintaining the communication of specific data (e.g., a length of resources allocated, modulation and coding scheme, and a list of connections) for each sub-burst transmission.

In some embodiments, mobile stations 110, 112, 114, and/or 116 may transmit a channel quality indication (CQI) to BS 118 (e.g., in each frame). BS 118 may use the CQI to adapt the modulation and coding rate, for example, for optimizing the downlink (e.g., and/or uplink) transmissions. In one embodiment, the CQI may be transmitted separately from the data link or MAP transmission. Since the modulation and coding schemes may be transmitted and/or updated for each sub-burst transmission, embodiments of the invention may provide network 100 having frequent link adaptation capabilities (e.g., for each new frame) for supporting highly dynamic mobile stations 110, 112, 114, and/or 116, configurations, and/or connections.

It may be appreciated that although embodiments of the invention may be described in reference to downlink transmissions, such embodiments may be applied to uplink transmission, for example, with suitable alterations. For example, uplink transmissions may operate in a similar, but not necessarily identical, manner to downlink transmissions.

In one embodiment, there may be multiple (e.g., five) connected mobile stations 110, 112, 114, and/or 116, transmitting sub-bursts (e.g., uplink and downlink transmissions) using multiple (e.g., three) different modulation and coding schemes. Downlink (e.g., and/or uplink transmissions) may be sent during linearized HARQ bursts. In some embodiments, data link or MAP signals transmitted in uplink transmission 214 may be substantially different from the data link or MAP signals transmitted in downlink transmission 212. In one embodiment, each of mobile stations 110, 112, 114, and/or 116 may have different requirements for uplink and downlink transmissions 214 and 212. Thus, uplink and downlink transmissions 214 and 212 and the data link or MAP signals transmitted therein, may be transmitted separately and/or according to the separate requirements of mobile stations 110, 112, 114, and/or 116. Other numbers of stations and modulation and coding schemes may be used.

For example, for a sequence of three frames, designated $F_1$, $F_2$ and $F_3$, the five mobile stations, designated $T_1, T_2, \ldots T_5$, may receive transmissions at one of three modulation and coding schemes, designated $M_1$, $M_2$, and $M_3$. BS 118 may use CQI transmissions to determine an appropriate modulation and coding scheme for each of the mobile stations in each of the frames. BS 118 may signal, instruct, or command each of the five mobile stations, $T_1, T_2, \ldots T_5$, in one of current frames, $F_1$, $F_2$ and $F_3$, to use the appropriate modulation and coding schemes for one of the sub-burst transmissions in a subsequent transmission, $F_2$, $F_3$ and $F_4$, respectively. According to such instructions, when the appropriate modulation and coding scheme may be different from a current or preceding modulation and coding scheme, the corresponding mobile station, $T_1, T_2, \ldots T_5$, may change the modulation and coding schemes to be used for a subsequent sub-burst transmission. The appropriate modulation and coding schemes to be used for each of mobile stations, $T_1, T_2, T_5$, for each of frames, $F_1$, $F_2$ and $F_3$, may be listed, for example, as shown in Table 1 as follows:

TABLE 1

|   | $F_1$ | $F_2$ | $F_3$ |
|---|---|---|---|
| $T_1$ | $M_1$ | $M_1$ | $M_1$ |
| $T_2$ | $M_1$ | $M_2$ | $M_1$ |
| $T_3$ | $M_3$ | $M_2$ | $M_2$ |
| $T_4$ | $M_2$ | $M_2$ | $M_2$ |
| $T_5$ | $M_3$ | $M_3$ | $M_3$ |

According to the embodiments described in reference to Table 1, during the first frame $F_1$, there may be, for example, two mobile stations $T_1, T_2, \ldots T_5$, that transmit sub-bursts using the first modulation scheme, $M_1$, one using the second modulation scheme, $M_2$, and two using the third modulation scheme, $M_3$. In one embodiment, the modulation schemes may be encoded in a data link or MAP descriptor signal using a numeric sequence. For example, when sub-burst transmissions having modulation schemes, $M_1$, $M_2$, and $M_3$, for example, corresponding to signal lengths, $X_1$, $X_2$ $X_3$, respectively, are transmitted, a code such as $(n_1,n_2,n_3)$ (e.g., which may be (2,1,2) in the example in frame 1 of Table 1) may indicate the numbers, $n_1$, $n_2$, $n_3$, of connection having the signal lengths, $X_1$, $X_2$, $X_3$, respectively. Specific mobile stations $T_1, T_2, \ldots T_5$, may be allocated specific resource units in a frame by listing the mobile stations $T_1, T_2, \ldots T_5$ or connection identifiers in the correct order. The data link or MAP information (e.g., excluding lengths of resource units for clarity) may be transmitted, for example, as shown in Tables 2, 3, and 4 as follows:

TABLE 2

| $F_1$ | |
|---|---|
| MCS1 | $M_1$ |
| $X_1$ | 2 |
|  | $T_1$ |
|  | $T_2$ |
| MCS2 | $M_2$ |
| $X_2$ | 1 |
|  | $T_4$ |
| MCS3 | $M_3$ |
| $X_3$ | 2 |
|  | $T_3$ |
|  | $T_5$ |

TABLE 3

| $F_2$ | |
|---|---|
| MCS1 | $M_1$ |
| $X_1$ | 1 |
|  | $T_1$ |
| MCS2 | $M_2$ |
| $X_2$ | 3 |
|  | $T_2$ |
|  | $T_3$ |
|  | $T_4$ |
| MCS3 | $M_3$ |
| $X_3$ | 1 |
|  | $T_5$ |

TABLE 4

| $F_3$ | |
|---|---|
| MCS1 | $M_1$ |
| $X_1$ | 2 |
|  | $T_1$ |
|  | $T_2$ |
| MCS2 | $M_2$ |
| $X_2$ | 2 |
|  | $T_3$ |
|  | $T_4$ |
| MCS3 | $M_3$ |
| $X_3$ | 1 |
|  | $T_5$ |

In such embodiments, each sub-burst may have one of a relatively few distinct lengths, each of which may correspond to a particular modulation and coding scheme. Using a single data link or MAP descriptor for transmitting information that concurrently describes multiple (e.g., all) sub-bursts having the same one of the few distinct signal lengths (e.g., or modulation schemes) may reduce the number and/or size of the data link or MAP signals used for individually describing the sub-bursts.

According to embodiments of the invention, since the data link descriptor may indicate the modulation and coding used for each mobile station, the BS 118 and/or mobile stations, designated $T_1, T_2, \ldots T_5$, may perform link adaptation, individually for each station and/or connection, for example, based on the station CQI transmissions.

Figure 4:
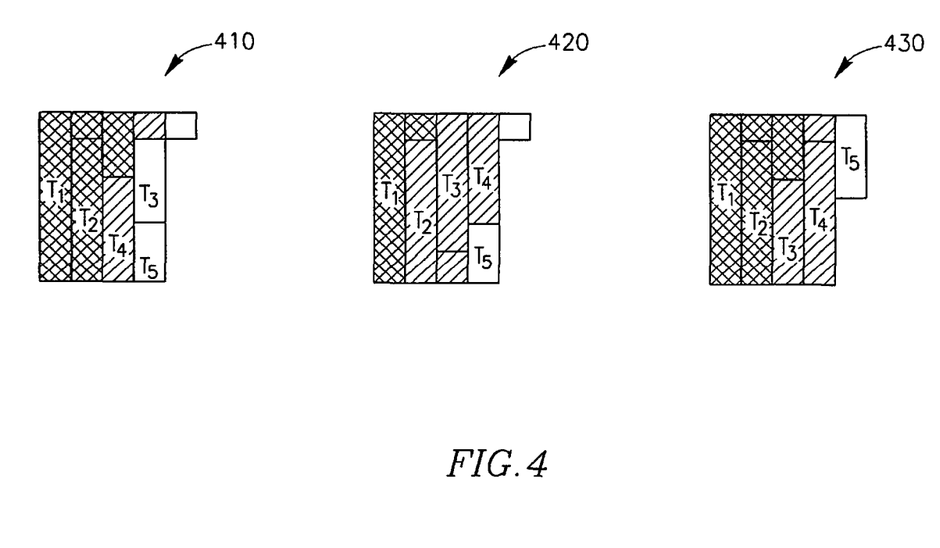
FIG. 4 is a schematic illustration of a reordering of modulation and coding schemes of transmissions for mobile station according to an embodiment of the present invention.

Reference is made to FIG. 4, which schematically illustrates a reordering of modulation and coding schemes of sub-bursts transmissions for mobile stations according to an embodiment of the invention. In some embodiments, sub-bursts for each modulation and coding scheme may appear in a predetermined or definite order. In one embodiment, sub-bursts corresponding to different connections may be reordered for each of different and/or consecutive frames 410, 420, 430, so that each sub-burst may be transmitted at a frame location that may correspond to a sub-burst having an appropriate modulation and coding scheme. In FIG. 4, the sub-burst transmission having each of modulation and coding schemes, $M_1$, $M_2$, $M_3$, may be indicated by a first, second, and third pattern, respectively.

According to embodiments of the invention, a MAP signal may include for example:
(i) numbers, $X_1, X_2, \ldots X_n$, each of which may correspond to one of the distinct lengths of resource units allocated to sub-bursts, and
(ii) the total number of connections, which may be defined for example as follows:

$N = \Sigma X_i$.

When N is bounded, the number of ways of partitioning N connections into n modulation and coding schemes is of the order $N^{n-1}$. For example, when n is small (e.g., approximately less than 5) a predetermined code may be used to represent a particular sequence, order, or permutations of the lengths, for example, $(X_1, X_2, \ldots X_n)$. For example, using a code to represent each sequence of length or numbers, $X_1, X_2, \ldots X_n$, may reduce the number of bits for representing the sequences, for example, compared to listing each sequence of the numbers, $X_1, X_2, \ldots X_n$.

For example, when $L_k(N)$ is the number of ways of partitioning N bursts into k different modulation and coding schemes ($MCS_1, MCS_2, \ldots MCS_k$), the following may be observed:
(i) when there is only one modulation and coding scheme ($MCS_1$), there may be one partitioning;
(ii) when there are two modulation and coding schemes, $MCS_1$ and $MCS_2$, there may be, for example, between 0 and N sub-bursts using the first modulation and coding scheme ($MCS_1$), and all other sub-bursts using the second modulation and coding scheme ($MCS_2$).
(ii) when k is greater than two, there may be a number, x, of sub-bursts, in which $0 \leq x \leq N$, using a first modulation scheme ($MCS_1$), and a number N–x of sub-bursts using the other modulation schemes ($MCS_1, MCS_2, \ldots MCS_k$), in which the other sub-bursts may be partitioned in $L_{k-1}(N-x)$ different modulation and coding schemes. For example:

$$L_1(N) = 1$$

$$L_2(N) = N + 1$$

$$L_3(N) = \frac{(N+1)(N+2)}{2}$$

$$L_k(N) = \sum_0^N L_{k-1}(i)$$

For example, to determine the number of ways of partitioning five sub-bursts transmissions (e.g., N=5) into three modulation and coding schemes (e.g., k=3), the function $L_k(N)$ may be evaluated, for example, in the expanded form, $$L_3(N) = \frac{(N+1)(N+2)}{2}.$$

For example, when five sub-bursts transmissions (e.g., N=5) are used $$L_3(5) = \frac{(5+1)(5+2)}{2} = 21.$$

Thus, there may be 21 ways of partitioning five sub-bursts transmissions into three modulation and coding schemes and/or 21 combinations of transmissions and modulation and coding schemes.

In one embodiment, a MAP signal (e.g., or a reference MAP code) transmitted by a mobile station may include a reference number (e.g., the value listed for the "code" field in the first column of each of Tables 5 and 6) indicating which one of multiple (e.g., 21) combinations of available characteristics (e.g., including an ordering of sub-burst transmissions and/or modulation and coding schemes) may correspond to the transmission. In some embodiments, the (e.g., 21) combinations may be represented using, for example, a (e.g., five) bit code. The (e.g., five) bit code representation may provide a signal size reduction, for example, as compared to (e.g., nine) bit conventionally used to individually list the sub-bursts transmissions and modulation and coding schemes. In some embodiments, an exemplary bit code representation may be summarized, for example, as shown in Tables 5 and 6 below:

TABLE 5

| Code | Pattern |
|------|---------|
| 0 | (0, 0, 5) |
| 1 | (0, 1, 4) |
| 2 | (0, 2, 3) |
| 3 | (0, 3, 2) |
| 4 | (0, 4, 1) |
| 5 | (0, 5, 0) |
| 6 | (1, 0, 4) |
| 7 | (1, 1, 3) |
| 8 | (1, 2, 2) |
| 9 | (1, 3, 1) |
| 10 | (1, 4, 0) |

TABLE 6

| Code | Pattern |
|------|---------|
| 11 | (2, 0, 3) |
| 12 | (2, 1, 2) |
| 13 | (2, 2, 1) |
| 14 | (2, 3, 0) |
| 15 | (3, 0, 2) |
| 16 | (3, 1, 1) |
| 17 | (3, 2, 0) |
| 18 | (4, 0, 1) |
| 19 | (4, 1, 0) |
| 20 | (5, 0, 0) |

For example, the values listed for each of $n_1$, $n_2$, and $n_3$ in patterns ($n_1, n_2, n_3$) (e.g., listed in the second column of each of Tables 5 and 6) may indicate the number of sub-bursts allocated to a particular mobile station within a particular frame, using each of the modulation and coding schemes, $M_1$, $M_2$ and $M_3$, respectively.

In one embodiment, shown in FIG. 4, resource units of frames 410, 420, and 430, may be allocated for each of multiple (e.g., five) mobile stations, $T_1, T_2, \ldots T_5$. In a demonstrative embodiment, each of the multiple mobile stations, $T_1, T_2, T_5$, may transmit sub-bursts according to one of (e.g., three) modulation and coding schemes, $M_1$, $M_2$ and $M_3$. For example, in frame 410, two sub-bursts may be transmitted (e.g., by $T_1$ and $T_2$) using the first modulation and coding scheme, $M_1$, one sub-burst may be transmitted (e.g., by $T_4$) using the second modulation and coding scheme, $M_2$, and two sub-bursts may be transmitted (e.g., by $T_3$ and $T_5$) using the third modulation and coding scheme, $M_3$. According to embodiments described herein, such an allocation of frame 410 resource units may be represented, for example, by the pattern (2,1,2), identified by a bit code representation, for example, code 12, in Table 6.

In some embodiments, applying the bit code representation scheme described herein to data link descriptor information may reduce the size of the information in the data link descriptor signal. For example, MAP signal information listed in Tables 2, 3, and 4, may be replaced by data link information listed in Tables 7, 8, and 9, respectively, having relatively fewer bits, for example, as follows:

TABLE 7

| $F_1$ | |
| --- | --- |
| MCS1 | $M_1$ |
| MCS2 | $M_2$ |
| MCS3 | $M_3$ |
| Code | 12 |
| | $T_1$ |
| | $T_2$ |
| | $T_4$ |
| | $T_3$ |
| | $T_5$ |

TABLE 8

| $F_2$ | |
| --- | --- |
| MCS1 | $M_1$ |
| MCS2 | $M_2$ |
| MCS3 | $M_3$ |
| Code | 9 |
| | $T_1$ |
| | $T_2$ |
| | $T_3$ |
| | $T_4$ |
| | $T_5$ |

TABLE 9

| $F_3$ | |
| --- | --- |
| MCS1 | $M_1$ |
| MCS2 | $M_2$ |
| MCS3 | $M_3$ |
| Code | 13 |
| | $T_1$ |
| | $T_2$ |
| | $T_3$ |
| | $T_4$ |
| | $T_5$ |

In some embodiments, (e.g., when using a variable-rate voice codec) a mobile station may operate in multiple modes, for example, a "silence" mode, an "active" mode, and/or other modes. Each of the sub-bursts transmitted by a mobile station operating in one of the modes may have substantially the same lengths as other sub-bursts transmitted by the mobile station operating in the same mode, and different length as other sub-bursts transmitted by the mobile station operating in different modes. For example, the mode of operation of a mobile station may determine the length of the sub-burst transmitted therefrom. In one embodiment, data link or MAP descriptors transmitted by the mobile station may be divided or grouped into different categories, for example, according to the mode of operation thereof.

For example, signals transmitted by a mobile station at fixed intervals may have a relatively short length when the mobile station is in a "silence" mode and a long length when the mobile station is in "active" mode. In one embodiment, mobile stations may be divided into one of multiple (e.g., two (2)) groups according to the mode of operation thereof, for example, by a base station (e.g., BS 118). In some embodiments, the base station may construct multiple (e.g., two (2)) different HARQ frame structures, for example, to be used by mobile stations in a corresponding one of the mode of operation groups. For example, the base station may construct one HARQ frame structure for mobile stations in a "silence" mode and one HARQ frame structure for mobile stations in an "active" mode. In one embodiment, the division of mobile stations into different modes may be modified for each frame transmission or, for example, each time a mobile station changes modes of operation.

Embodiments of the invention may reduce system (e.g., data link of MAC layer) overhead for data link or MAP descriptor transmissions in mobile wireless networks (e.g., network 100, such as a WiMAX network), for example, when a substantially large number of voice channels, connections, mobile or other stations, and/or transmissions are used. According to some embodiments of the invention, modulation and coding scheme information corresponding to substantially each sub-burst may be transmitted in the optimized data link or MAP descriptors, which may enable base stations to change such schemes (e.g., perform link adaptation) between consecutive transmission frames, for supporting rapidly changing systems or networks.

In one embodiment, a base station may signal a mobile station to change modulation and coding schemes to be used for one or more of the station transmissions, for example, in subsequent frames. For example, a receiver (e.g., receiver 124) of the mobile station may receive the signal command from the base station and may change a modulation and coding scheme to be used for at least one of the sub-burst transmissions in subsequent transmissions. For example, once the mobile station changes the modulation and coding scheme to be used for the at least one of the sub-burst transmission, a transmitter (e.g., transmitter 122) may transmit a corresponding altered numerical code in the data link descriptor or MAP signal indicating a different modulation and coding scheme to be used by the at least one of the sub-burst transmissions.

Figure 5:
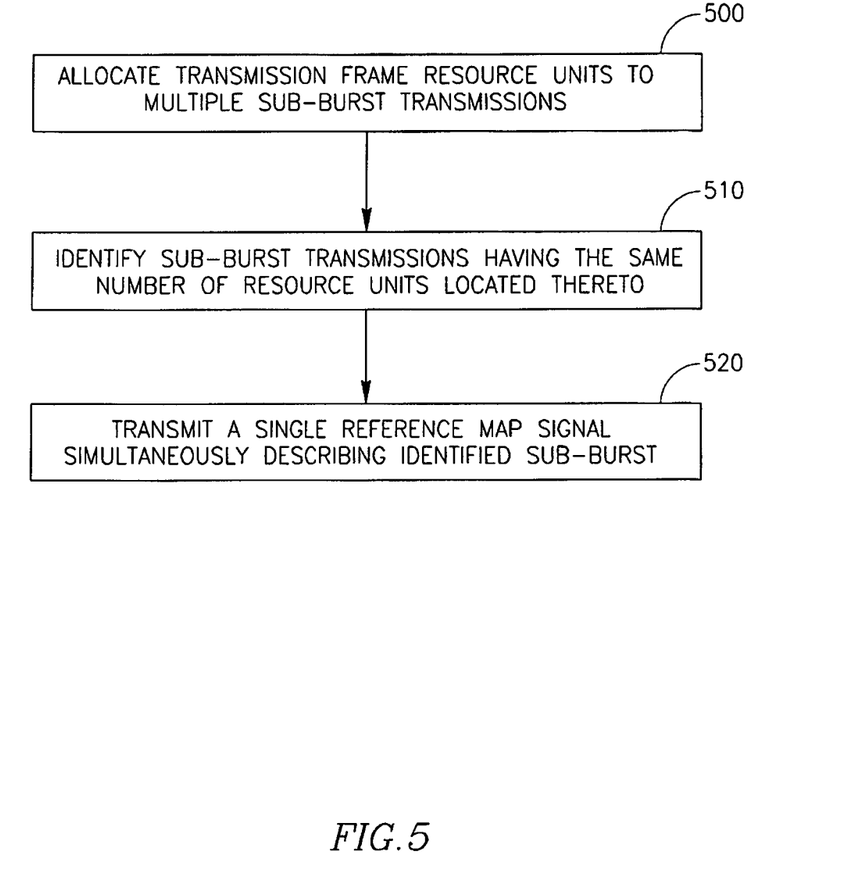
FIG. 5 is a flow chart of a method according to an embodiment of the present invention.

Reference is made to FIG. 5, which is a flow chart of a method according to an embodiment of the present invention.

In operation 500, a processor or controller in for example a mobile station may partition or allocate lengths of resource units in a transmission frame to each of multiple sub-burst transmissions, sub-frames, or other transmission units, to be transmitted by a wireless devices such as, for example, a mobile station. In one embodiment, resource units in a HARQ signal may be allocated to each of multiple sub-burst transmissions.

In operation 510, a processor may determine or identify which two or more of the multiple sub-burst transmissions have common characteristics including, for example, a length of resource units allocated thereto and a modulation and coding scheme to be used for the sub-burst transmissions. In one embodiment, the processor may determine which two or more of the multiple sub-bursts transmissions have the same modulation and coding scheme and the same length of resource units allocated thereto.

In operation 520, a transmitter in the mobile station may transmit a single reference data link or MAP descriptor signal, or other data structure, for simultaneously describing the identified sub-bursts having common characteristics qualities, or parameters or the same modulation and coding scheme and the same length of resource units allocated thereto. The data link descriptor may be transmitted, for example, according to a predefined reference data link code for describing substantially simultaneously the characteristics determined to be common to two or more of the multiple sub-burst transmissions. In other embodiments, the transmitter in the mobile station may transmit a data link descriptor describing two or more of the multiple sub-bursts transmissions, determined to have the same modulation and coding scheme and the same length of resource units allocated thereto. In such embodiments, the data link descriptor may include, for example, the length of resource units allocated to each of the two or more of the multiple sub-burst transmissions, the modulation and coding scheme used by each of the two or more of the multiple sub-burst transmissions, and a list of a fixed length of connections for sub-burst transmissions using the modulation and coding scheme used by each of the two or more of the multiple sub-burst transmissions. In one embodiment, the list of a fixed length of connections may be denoted by a code. According to embodiments of the invention, as used herein, the term sub-burst or sub-burst transmission may refer to any transmission, one or more frames, signals, sub-bursts, frame divisions, portions, or subsection, sub-frames, resource units, other transmissions, or a composite thereof.

In some embodiments, separate data link descriptor signals may be used to describe uplink and downlink transmissions of a mobile station and/or the list of a fixed length of connections for the transmissions, for example, in subsequent and current transmission frames, respectively. In some embodiments, the data link descriptors may include a numerical or other type of ordered sequence, for example, according to the mechanisms described in reference to FIGS. 5 and 6, in which where each of one or more of the locations in the ordered sequence may be used, for example, to describe a characteristic common to the multiple sub-burst transmissions. In one embodiment, an ordered MAP signal sequence may describe a series of transmissions each having a number of resource units allocated thereto, in which each of a first two or more locations in the ordered sequence may be pre-designated to describe one of two or more lengths of resource units of a subset of the transmissions, each of a second plurality of locations in the ordered sequence may be pre-designated to describe the number of transmissions having the length described in one of the first plurality of locations, and a third plurality of locations in the ordered sequence may be pre-designated to describe a number of transmissions using one of a plurality of modulation and coding schemes.

In one embodiment, when a transmission using a first modulation and coding scheme changes to use a second modulation and coding scheme, the value at the location of the ordered MAP signal sequence describing the number of sub-burst transmissions using the second modulation and coding scheme may be incremented and the value at the location of the ordered MAP signal sequence describing the number of sub-burst transmissions using the first modulation and coding scheme may be decremented.

In some embodiments, the MAP signal sequence may include a numerical code that represents the characteristic common to the multiple sub-burst transmissions, wherein the numerical code may be selected from among multiple codes, each representing one of multiple permutations of different lengths of resource units and different types of modulation and coding schemes. In one embodiment, the ordered MAP signal sequence may be selected from one of two or more predefined patterns. In one embodiment, each of the predefined patterns is represented by a bit code representation. Each of the predefined patterns may represent one of the permutations of the available or used lengths of resource units and the available or used types of modulation and coding schemes.

A subset of locations in the ordered sequence may be pre-designated to describe a characteristic selected from the group consisting of: a list of a fixed length of connections, a protocol control information descriptor, a preamble, a preamble sequence, a header, a recipient node descriptor, a source address, a service access point (SAP), an error detection sequence, an inter frame gap descriptor, a byte order descriptor, a carrier sense multiple access (CSMA) descriptor, and a collision detection (CD) descriptor, or other characteristics.

In some embodiments, the transmitter in the mobile station may transmit each of the sub-burst transmissions in a region of a HARQ signal allocated thereto.

In some embodiments, the processor may perform link adaptation. In one embodiment, the mobile stations may change one of the modulation and coding schemes to be used for one of the sub-burst transmissions in subsequent transmissions. In another embodiment, the processor may change the modulation and coding scheme used for one of the plurality of sub-burst transmissions and the processor may add the connection used for the one of the plurality of sub-burst transmissions to the second list of a fixed length of connections.

In some embodiments, the transmitter in the mobile station may further transmit a second data link descriptor according to the predefined data link descriptor code for describing substantially simultaneously characteristics common to a second multiple sub-burst transmissions. In one embodiment, the data link descriptor may further include a second length of resource units allocated to each of a second multiple sub-burst transmissions, a second modulation and coding scheme used by each of the second multiple sub-burst transmissions, and a second list of a fixed length of connections for sub-burst transmissions using the second modulation and coding scheme.

Embodiments of the invention may be used in any sequence and/or in any combination and components of respective embodiments may be combined in any other sequences, orders, and/or permutations of embodiments described herein. Embodiments of the invention may be used with any number of mobile stations, base stations, networks, modulation and coding schemes, modes of operations, frame structures, HARQ frame structures, time and frequency schemes, resource unit size in time and frequency, resource units allocated to mobile station transmissions, etc.

Embodiments of the invention may include a computer readable storage medium, such as for example a memory, a disk drive, or a "disk-on-key", including instructions which when executed by a processor or controller, carry out methods disclosed herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

The invention claimed is:

1. A method for communicating in a mobile wireless network, the method comprising:
transmitting an ordered medium access protocol (MAP) signal sequence describing a series of transmissions, each transmission having a corresponding number of allocated resource units, the ordered MAP signal sequence using a single MAP descriptor for transmitting information that concurrently describes multiple sub-bursts having the same one of a set of distinct signal lengths of resource units,
each of a first plurality of locations in the ordered MAP signal sequence being pre-designated to describe a corresponding one of a plurality of distinct signal lengths of resource units of a subset of the transmissions, each distinct signal length corresponding to a pre-designated modulation scheme, each of a second plurality of locations in the ordered MAP signal sequence corresponding to one of the first plurality of locations in the ordered MAP signal, each second plurality of locations in the ordered MAP signal sequence being pre-designated to describe a number of sub-bursts that are to have the distinct signal length of resource units described in the corresponding one of the first plurality of locations, and a third plurality of locations in the ordered MAP signal sequence being pre-designated to describe a device that is to transmit a sub-burst in each of the plurality of distinct signal lengths of resource units corresponding to each of the first plurality of locations using the pre-designated modulation scheme corresponding to the distinct signal length.

2. The method of claim 1, wherein the ordered MAP signal sequence describing characteristics common to the plurality of sub-burst transmissions is selected from one of a plurality of predefined patterns.

3. The method of claim 2, wherein each of the predefined patterns is represented by a bit code representation.

4. The method of claim 2, wherein each of the predefined patterns represents one of a plurality of permutations of the plurality of lengths of resource units and the plurality of types of modulation and coding schemes.

5. The method of claim 1, wherein at least two of the series of transmissions use different modulation and coding schemes.

6. The method of claim 5, wherein when a first transmission of the series of transmissions uses a first modulation and coding scheme that corresponds to a first distinct signal length and a second transmission of the series of transmissions that is immediately subsequent to the first transmission uses a second modulation and coding scheme and corresponds to a second distinct signal length, a value at the location of the ordered MAP signal sequence describing the number of sub-bursts using the second distinct signal length is incremented and a value at the location of the ordered MAP signal sequence describing the number of transmissions using the first distinct signal length is decremented.

7. The method of claim 1, wherein a subset of locations in the ordered sequence is pre-designated to describe a characteristic selected from the group consisting of: a list of a fixed length of connections, a protocol control information descriptor, a preamble, a preamble sequence, a header, a recipient node descriptor, a source address, a service access point (SAP), an error detection sequence, an inter frame gap descriptor, a byte order descriptor, a carrier sense multiple access (CSMA) descriptor, and a collision detection (CD) descriptor.

8. A system for communicating in a mobile wireless network, the system comprising:
a transmitter to transmit a reference medium access protocol (MAP) signal, the MAP signal comprising an ordered medium access protocol (MAP) signal sequence describing a series of transmissions, each transmission having a corresponding number of allocated resource units, the ordered MAP signal sequence using a single MAP descriptor for transmitting information that concurrently describes multiple sub-bursts having the same one of a set of distinct signal lengths of resource units,
each of a first plurality of locations in the ordered MAP signal sequence being pre-designated to describe a corresponding one of a plurality of distinct signal lengths of resource units of a subset of the transmissions, each distinct signal length corresponding to a pre-designated modulation scheme, each of a second plurality of locations in the ordered MAP signal sequence corresponding to one of the first plurality of locations in the ordered MAP signal, each second plurality of locations in the ordered MAP signal sequence being pre-designated to describe a number of sub-bursts that are to have the distinct signal length of resource units described in the corresponding one of the first plurality of locations, and a third plurality of locations in the ordered MAP signal sequence being pre-designated to describe a device that is to transmit a sub-burst in each of the plurality of distinct signal lengths of resource units corresponding to each of the first plurality of locations using the pre-designated modulation scheme corresponding to the distinct signal length.

9. The system of claim 8, wherein each of the predefined patterns is represented by a bit code representation.

10. The system of claim 9, wherein each of the predefined patterns represents one of a plurality of permutations of the plurality of lengths of resource units and the plurality of types of modulation and coding schemes.

11. The system of claim 8, wherein at least two of the transmissions use different modulation and coding schemes.

12. The system of claim 11, wherein when a first transmission of the series of transmissions uses a first modulation and coding scheme that corresponds to a first distinct signal length and a second transmission of the series of transmissions that is immediately subsequent to the first transmission uses a second modulation and coding scheme and corresponds to a second distinct signal length, a value at the location of the ordered MAP signal sequence describing the number of sub-bursts using the second distinct signal length is incremented and a value at the location of the ordered MAP signal sequence describing the number of transmissions using the first modulation and coding scheme is decremented.

13. The system of claim 8, wherein a subset of locations in the ordered sequence is pre-designated to describe a characteristic selected from the group consisting of: a list of a fixed length of connections, a protocol control information descriptor, a preamble, a preamble sequence, a header, a recipient node descriptor, a source address, a service access point (SAP), an error detection sequence, an inter frame gap descriptor, a byte order descriptor, a carrier sense multiple access (CSMA) descriptor, and a collision detection (CD) descriptor.

* * * * *